United States Patent [19]
Yamamuro

[11] Patent Number: 4,928,173
[45] Date of Patent: May 22, 1990

[54] PICTURE DISPLAY DEVICE

[75] Inventor: Takahiko Yamamuro, Nagasaki, Japan

[73] Assignee: Mitsubishi Denki Kabushiki Kaisha, Tokyo, Japan

[21] Appl. No.: 369,831

[22] Filed: Jun. 22, 1989

[30] Foreign Application Priority Data

Nov. 17, 1988 [JP] Japan .................. 63-292978

[51] Int. Cl.⁵ .............................. H04N 7/18
[52] U.S. Cl. ...................... 358/102; 358/453
[58] Field of Search ............. 358/102, 76, 139, 450, 358/453

[56] References Cited

U.S. PATENT DOCUMENTS 4,264,808  4/1981  Owens .................. 358/453
4,782,390  11/1988  Hayashi ................ 358/76

FOREIGN PATENT DOCUMENTS 61-198993  12/1986  Japan .
62-44353  3/1987  Japan .

Primary Examiner—Howard W. Britton
Attorney, Agent, or Firm—Burns, Doane, Swecker & Mathis

[57] ABSTRACT

A picture display device can indicate information of plural still pictures, and comprises an increased unit enclosing plural frame memory boards for inputting and storing the picture signals through a buffer circuit and indicating the pictures onto respective displays connected individually, an image file controller acting as a host controller, and a buffer board connected to the image controller and supplying the picture signals stored in the image file controller to a buffer circuit in the increased unit. Information of different pictures can be transmitted and stored respectively to plural sheets of the frame boards for indication only, thereby the information of respective pictures can be indicated on respective plural displays individually and simultaneously.

1 Claim, 2 Drawing Sheets

PICTURE DISPLAY DEVICE

BACKGROUND OF THE INVENTION

1. Field of the Invention

The present invention relates to a picture display device where information of plural still pictures can be indicated simultaneously on individual displays.

2. Description of the Prior Art

FIG. 1 is a configuration diagram of a picture display device in the prior art. In FIG. 1, an image file controller 1 to control the whole device stores picture signals taken in a picture input/output device 3, and outputs the still picture signals stored therein through the picture input/output device 3 to a monitoring display 4. Control during this process is performed in that a man operates a flat visual terminal 2 as a man-machine interface and issues desired command.

In the picture display device of the prior art in such configuration, the image file controller 1 is a host controller to control the whole system, and controls the flat visual terminal 2 and the color picture input/output device 3 of high precision. The image file controller 1 has also a memory device at the inside to store the picture data read by the picture input/output device 3. The flat visual terminal 2 is a man-machine interface, and the operator operates the system using a touch pen based on message indicated on the flat visual terminal 2. The picture input/output device 3 is a picture reading device, and indicates the read picture data onto the display 4. As above described, the read data may be also stored in the memory device within the image controller 1. Also the picture data stored in the image file controller 1 can be indicated on the display 4 through the picture input/output device 3.

Since the picture display device in the prior art is constituted as above described, information of the still pictures read by the picture input/output device 3 can be stored in sequence in the image file controller 1 and then indicated in sequence on the display 4, but plural pictures cannot be indicated simultaneously on individual displays On the other hand, Japanese utility model application laid-open No. 198993/1986 discloses "a medical picture display device" and Japanese utility model application laid-open No. 44353/1987 discloses "a picture processor", and both references disclose the technical idea of indicating pictures onto a plurality of displays respectively.

In any of these, a part of one still picture is subjected to the picture processing such as enlargement, contraction or the like thereby the part of one still picture is indicated in dividing on a plurality of displays, but required pictures among information of the plural still pictures are not indicated individually on a plurality of displays.

Since the picture display device in the prior art is constituted as above described, in order to indicate plural pieces of information simultaneously on a plurality of displays, a plurality of devices must be prepared.

SUMMARY OF THE INVENTION

An object of the invention is to provide a picture display device wherein information of plural different pictures can be indicated simultaneously on a plurality of individual displays.

Another object of the invention is to provide a picture display device wherein one flat visual terminal is operated thereby information of plural different pictures can be transmitted, stored and indicated.

The foregoing and other objects and novel features of the invention will appear more fully from the following detailed description when the same is read in connection with the accompanying drawings. It is to be understood, however, that the drawings are for purpose of illustration only and are not intended as a definition of the limits of the invention.

In order to attain the above objects, a picture display device according to the invention comprises an increased unit enclosing a plurality of frame memory boards for inputting and storing picture signals through a buffer circuit and for indicating the pictures on individual connected displays, an image file controller acting as a host controller, and a buffer board connected to the image file controller and supplying the picture signals stored by the image file controller to a buffer circuit in the increased unit.

That is, in the picture display device of the invention, since plural sheets of frame memory boards for indication only are used, information of different pictures can be transmitted and stored on respective memory boards, thereby information of respective pictures can be indicated on respective plural displays individually and simultaneously.

DETAILED DESCRIPTION OF THE PREFERRED EMBODIMENTS

Preferred embodiments of the invention will now be described in detail referring to the accompanying drawings.

Figure 1:
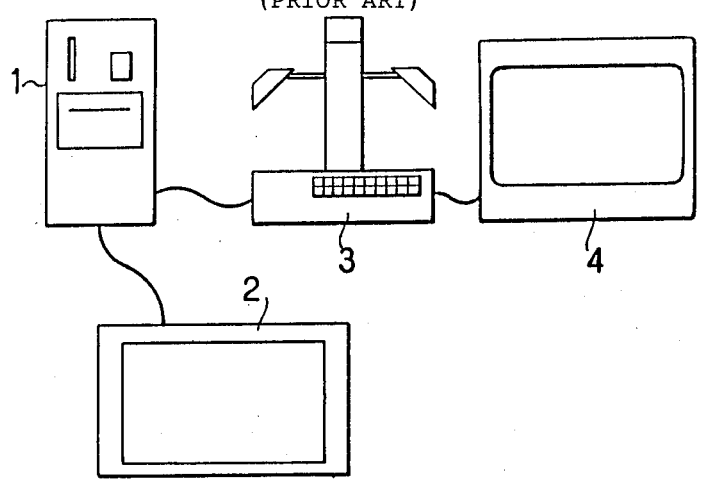
FIG. 1 is an explanation diagram illustrating constitution of a picture display device in the prior art.
Figure 2:
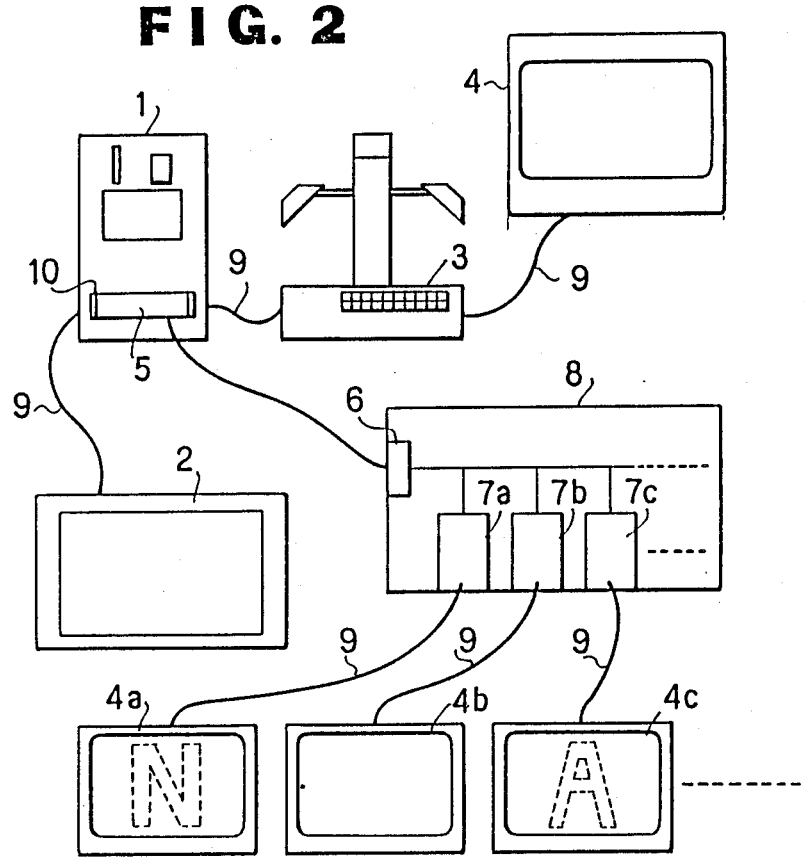
FIG. 2 is an explanation diagram illustrating constitution of a picture display device according to an embodiment of the invention.

In FIG. 2, connection between an image file controller 1 and a flat visual terminal 2, between the image file controller 1 and a picture input/output device 3, and between the picture input/output device 3 and a display 4 is performed respectively by cables 9. The image file controller 1 according to the invention is previously provided with an option slot 10, and a buffer board 5 is fitted to the option slot 10 so that the buffer board 5 is connected electrically to the image file controller 1.

The buffer board 5 is also connected conductively through the cable 9 to a buffer circuit 6 installed in an increased unit 8.

In the increased unit 8, a plurality of frame memory boards 7a, 7b, 7c ... for inputting and storing the picture signals stored in the image file controller 1 are installed through the buffer circuit 6. The plurality of frame memory boards 7a, 7b, 7c ... are connected through the cables 9 to individual displays 4a, 4b, 4c ... respectively, and the still pictures inputted and stored therein can be indicated in the individual displays 4a, 4b, 4c ... respectively.

In such constitution, the pictures confirmed by viewing the display 4 are inputted as information of electric signals from the picture input/output device 3 to the image file controller 1, and a number of still pictures are previously stored. Consequently, the operator can operate the flat visual terminal 2 and indicate desired pictures or desired sets of pictures stored by the image file controller 1 in sequence onto the desired displays 4a, 4b, 4c . . .

Figure 3:
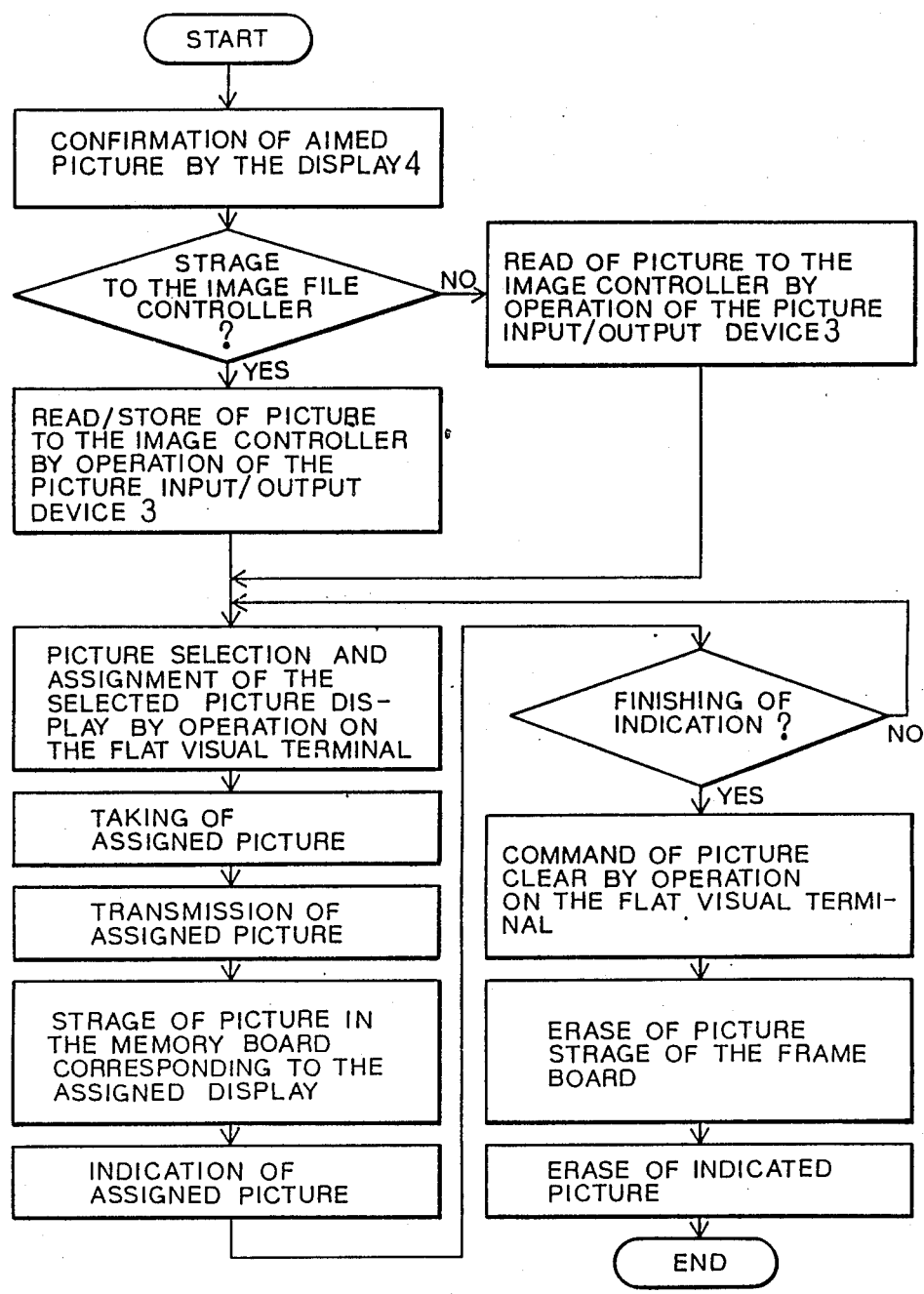
FIG. 3 is a flowchart illustrating operation of a picture display device according to an embodiment of the invention.

FIG. 3 is a flowchart illustrating operation of a picture display device according to an embodiment of the invention.

For example, if the command to indicate the A picture stored previously by the image file controller 4c is given through the flat visual terminal 2 to the image file controller 1, the image file controller 1 takes the A picture signal and transmits it through the buffer board 5 and the buffer circuit 6 to the frame memory board 7c, and in response to this, the frame memory 7c stores the transmitted picture signal and indicates the A picture on the display 4c.

Next, if the command to indicate the N picture onto the display 4a is issued, in similar manner, the N picture stored by the image file controller 1 is stored in the frame board 7a and indicated on the display 4a, thus the N picture is indicated on the display 4a and the A picture is indicated on the display 4c simultaneously.

If the picture clear is commanded from the flat visual terminal 2, the storage of the frame memory board is erased and the picture on the display is also erased. And then next picture indication may be performed or the overlapped picture indication may be performed without erasing the previous picture.

Although the picture is stored previously in the image file controller 1 in the above description, the picture data read by the picture input/output device 3 may be transmitted through the image file controller 1 to the frame memory boards 7a, 7b, 7c . . . immediately and the picture indication may be performed on the displays 4a, 4b, 4c . . .

In the invention as above described, since the increased unit to enclose plural sheets of the frame memory boards for indication only can be connected to one image file controller acting as a host controller, operation of one flat visual terminal enables the indication of the information of plural pictures onto respective individual displays simultaneously.

What is claimed is:

1. A picture display device comprising:
   an image file controller for storing inputted pictures in arbitrarily taken state and for controlling the whole device;
   a flat visual terminal being an operation terminal of said image file controller;
   a picture input/output device connected to said image file controller for taking the pictures and outputting the picture indication signals;
   displays connected as indication parts to said picture input/output device for monitoring the inputted pictures of said picture input/output device and for indicating the stored pictures of said image file controller;
   a buffer board connected to said image file controller; and
   an increased unit having a plurality of frame memory boards for inputting and storing the picture signals stored in said image file controller through a buffer circuit connected conductively to said buffer board in response to operation of said flat visual terminal and for indicating the pictures onto respective displays connected individually.

* * * * *